(12) United States Patent  (10) Patent No.: US 9,054,942 B1
De Temmerman et al.  (45) Date of Patent: Jun. 9, 2015

(54) MONITORING OF SERVICES

(75) Inventors: Pieter Joris De Temmerman, Seattle, WA (US); David R. Azari, Seattle, WA (US); Daniel Lee Osiecki, Seattle, WA (US); Ronald Kim Peterson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1159 days.

(21) Appl. No.: 11/960,918

(22) Filed: Dec. 20, 2007

(51) Int. Cl.
*G06F 15/173* (2006.01)
*H04L 12/26* (2006.01)

(52) U.S. Cl.
CPC .............. *H04L 43/00* (2013.01); *H04L 43/045* (2013.01)

(58) Field of Classification Search
CPC ....... H04L 43/00; H04L 43/045; H04L 43/14; H04L 43/062; H04L 43/0875; H04L 41/00; G06F 11/3495; G06F 11/30
USPC ................. 709/202, 204, 220–226; 358/1.15; 705/6, 1, 28, 26, 27, 56, 35, 37, 44, 10; 717/121, 126, 177, 101; 707/100, 10; 714/25–34

See application file for complete search history.

(56) References Cited

U.S. PATENT DOCUMENTS

2003/0105850 A1* 6/2003 Lean et al. ................ 709/223
2008/0034072 A1* 2/2008 He et al. ................... 709/223

* cited by examiner

*Primary Examiner* — John MacIlwinen
(74) *Attorney, Agent, or Firm* — Thomas | Horstemeyer, LLP

(57) ABSTRACT

Various systems, methods, and programs embodied on a computer readable medium that facilitate monitoring of services and servers. In one embodiment, an amount of data is stored in at least one storage device, the data being generated by a plurality of services executed on a plurality of servers, and by the servers upon which the services are executed. A plurality of monitoring applications are executed in a monitoring server, the monitoring applications being configured to perform a plurality of monitoring functions with respect to at least a portion of the data to facilitate an assessment of an operating condition of the services and the servers. An interface layer surrounds the monitoring applications in the monitoring server. The interface layer defines a messaging format that is used by devices external to the interface layer to interact with the monitoring applications.

55 Claims, 6 Drawing Sheets

MONITORING OF SERVICES

BACKGROUND

In the last 20 years, many commercial entities have emerged that have a presence on the Internet. For example, many merchants now sell their wares online. In some situations, some merchants have become very large, selling massive quantities of goods over the Internet as online purchasing becomes more popular. The systems employed by such merchants include vast server banks that run many applications. Such servers and systems may generate vast amounts of data that indicates the health of such systems. For example, applications executed on different hosts may generate logs that document how the applications respond to each request they receive. Also, logs are typically created by the servers themselves that document the operational health of the hardware running the various applications of the online merchants.

Current servers and applications operated by online entities generate log data and other monitoring data that is stored for future reference. In some cases, the amount of log and monitoring data produced daily can be huge. For example, for some online merchants, it is not unheard of for the volume of log and monitoring data generated each day to be measured in the terabytes. Also, such data is typically generated and stored separately for each host in a bank such as a server bank. As a consequence, it can be very difficult to access such data in order to diagnose the health of servers and applications running on them in real time.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
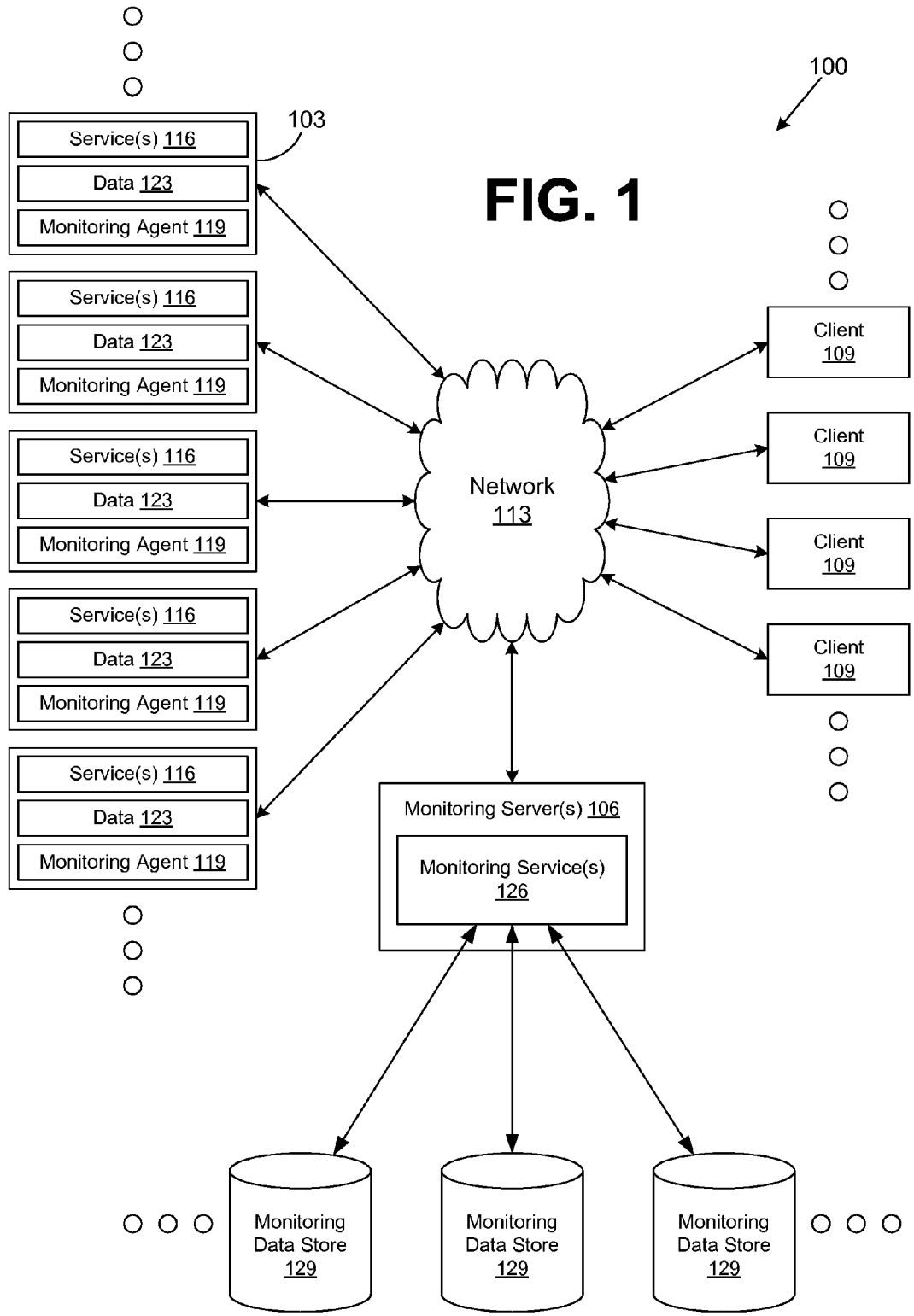
FIG. 1 is a drawing of a monitoring network according to the various embodiments of the present disclosure.

With reference to FIG. 1, shown is an example of a monitoring network 100 according to various embodiments of the present disclosure. The monitoring network 100 includes a plurality of servers 103 and one or more monitoring servers 106. In addition, the monitoring network 100 includes a plurality of clients 109. The monitoring network 100 may include other devices not shown in FIG. 1. The servers 103, monitoring servers 106, and clients 109 are in data communication with each other through a network 113. The network 113 may comprise, for example, the Internet, intranets, wide area networks (WANs), local area networks, wireless networks, or other suitable networks, etc., or any combination of two or more such networks.

Each of the servers 103 comprises, for example, a processor-based system that is employed to execute one or more services 116. Also, each of the servers 103 may be employed to execute one or more monitoring agents 119. The services 116 executed on the servers 103 cause the generation of data 123. Similarly, the operation of the servers 103 may result in the creation of data 123 when the services 116 are executed thereon. Such data may be, for example, log data that records the occurrence of various events as can be appreciated. Alternatively, the data 123 may comprise metrics associated with various aspects of the operation of the services 116 and the servers 103 as will be described. For example, such metrics may comprise measurements, events, information about components such as servers 103 or other device, or information about relationships between services 116 and other relationships. In various embodiments, the metrics may be obtained from the log data obtained from the services 116 and server 103.

The services 116 executed on the servers 103 may be employed for various purposes such as to facilitate, for example, the operation of an online merchant, search engine, or other applications. To this end, the servers 103 may exist in vast server banks designed to handle a significant load of traffic on the network 100. In some large scale server banks, the servers 103 and services 116 executed thereon may generate huge amounts of data 123. For example, it is not unheard of that server banks that facilitate large scale online search engines can typically generate amounts of access logs each day measuring in the terabytes.

Unfortunately, the logs and other data generated by such the servers 103 and services 116 in such large scale server banks are generated by individual hosts. As a consequence, such log data typically cannot be easily accessed in real time to ascertain the overall health of the services 116 and the servers 103. This can make it difficult to find the cause of various problems in a timely manner. Specifically, personnel are often required to sift through logs from individual hosts to determine the cause of a particular problem. Also, the distributed nature of log data and other data can make it difficult to be proactive to predict problems before they occur.

The one or more monitoring servers 106 comprise, for example, processor-based systems that are employed to execute monitoring service(s) 126. The monitoring service(s) 126 store data to, and access data from various monitoring data stores 129. The monitoring data stores 129 may be accessed by the monitoring services 126 through an appropriate network, or the monitoring data stores 129 may be directly coupled to the monitoring server 106 such as through a data bus or other local interface.

Each of the clients 109 may comprise, for example, a processor-based system such as, for example, a computer system, personal digital assistant, or other system as can be appreciated. Various applications may be executed in the clients 109 in order to interact with the services 116 and the monitoring services 126 including, for example, browsers, automated monitoring applications, or other applications.

During the operation of the services 116 on the servers 103, the data 123 is generated as described above. In particular, the services 116 may generate the data 123 during a normal course of operation. Specifically, the services 116 may generate logs such as access logs or various metrics that memorialize various events that occurred during the operation of the services 116. Also, the servers 103 may generate the data 123 while executing the services 116. Such data may include logs or metrics indicating memory usage and other factors as can be appreciated. In some cases, metrics may be included in the logs generated, or may be calculated based upon the information in the logs. Metrics may also be calculated based upon a number of logs created over a predefined period of time. Also, the metrics may comprise various measurements, events, and other data as described above. In this respect, the metrics may also comprise alarms or alarm conditions, service components, and data indicative of relationships between services 116, etc. In addition, the data 123 may comprise other data not described herein in detail.

Generally, logs comprise unstructured data whereas metrics comprise structured data. In this respect, the logs are unstructured in that they are stored in an unstructured format at an atomic level. Such data contrasts with metrics that are structured in that they have an enforced composition at the atomic level. For example, metrics may comprise a value that represents an aggregation of information obtained from one or more logs over a period of time. Also, a metric may comprise, for example, a count of how many of a type of log has been generated over a period of time.

The monitoring agents 119 that are executed on the servers 103 act to send the data 123 through the network 113 to the monitoring service(s) 126. The monitoring service(s) 126 process the data and cause the data 123 to be stored in one of the monitoring data stores 129. Also, the monitoring service(s) 126 perform various monitoring functions relative to the data 123 stored in the monitoring data stores 129. To this end, the monitoring service(s) 126 perform various monitoring and diagnostic functions to ensure availability of the services 116 executed on the servers 103, as well as to ensure low latency and reliability with respect to the operation of the services 116.

The monitoring service(s) 126 operate in isolation of the operation of the services 116 and the servers 103. In this respect, the monitoring functions that are performed by the monitoring service(s) 126 are performed relative to the data stored in the monitoring data stores 129 and do not depend upon interrupts or other messages from the services 116 or the servers 103.

The monitoring service(s) 126 also provide a monitoring output to the clients 109, services 116, or other devices or system components. For example, the clients 109 may interact with the monitoring service(s) 126 to receive various outputs that give an assessment of the operating condition of the services 116 and the servers 103. To this end, the monitoring service(s) 126 access the data 123 stored in their respective monitoring data stores 129 to generate outputs that provide an assessment of an operating condition of the services 116 and the servers 103 that generated the data 123 in the first place. Also, services 116 may access the data 123 as needed to perform various functions. The access to the data 123 may be based upon user manipulation of an application such as a browser or other application. Alternatively, the access to the data 123 may be an automatic function that is preprogrammed as can be appreciated.

The output that provides the assessment of the operating condition of the services 116 in the servers 103 may include various graphs, charts, or other user interface components to depict various metrics, logs, or other information obtained from the data 123. Given that the monitoring service(s) 126 operate on the data 123 that is stored in the respective monitoring data stores 129, the operation of the monitoring service(s) 126 is independent of the operation of the services 116 and the servers 103 upon which the services 116 are executed.

The monitoring service(s) 126 act only on data that was received from the monitoring agents 119 in the servers 103. Thus, there is inherently a delay between the time when the data is generated and when the data is received by the monitoring service(s) 126. Thus, there is a delay between when data is generated and when monitoring applications can perform monitoring functions with respect to the data. Where data 123 is transmitted from the servers 103 to the monitoring servers 106 periodically within short intervals, the delay may be minimized. As such, the data 123 may be accessed in "near real time" as can be appreciated.

Similarly, a user of a given client 109, a service 116, or other system may receive an output that provides an assessment of the operating condition of the services 116 and the servers 103 by interacting with the respective monitoring service(s) 126. In this respect, the clients 109 or other systems do not interact directly with either the services 116 or the servers 103. Also, the services 116 obtain needed information from the monitoring service 126 rather than from the data that they generate and store locally during operation.

According to various embodiments, the monitoring agents 119 are configured to send data 123 generated by the services 116 and servers 103 at predefined time intervals. These time intervals are specified so that the monitoring service(s) 126 guarantee access to the data to provide for diagnostic capabilities within a predefined time of an occurrence of a given event or problem. Thus, the frequency at which data 123 is transmitted from a monitoring agent 119 to the monitoring service(s) 126 can depend, for example, upon a guaranteed access time to the data 123 for various diagnostic capabilities as will be described.

The monitoring network 100 provides at least one advantage in that the data 123 is offloaded from the servers 103 to the monitoring data stores 129. This relieves the servers 103 of having to store the data 123. When various server banks of servers 103 generate amounts of data measured in the terabytes each day, this can be significant. In addition, given that the monitoring service(s) 126 are executed on the monitoring servers 106, the servers 103 are relieved of the burden of operating the monitoring service(s) 126 locally which would reduce the capacity of the servers 103 to execute the services 116.

Also, if the data 123 is stored locally on the servers 103, then if the servers 103 experience a failure, the data 123 may become inaccessible. This can result in a server 103 that fails with little or no ability to access the logs or other data 123 that provide information as to what is wrong with the server 103 to resolve the failure. By offloading the data 123 from the servers 103 to the monitoring data stores 129, such data 123 is always available to troubleshoot the operation of the servers 103.

Figure 2:
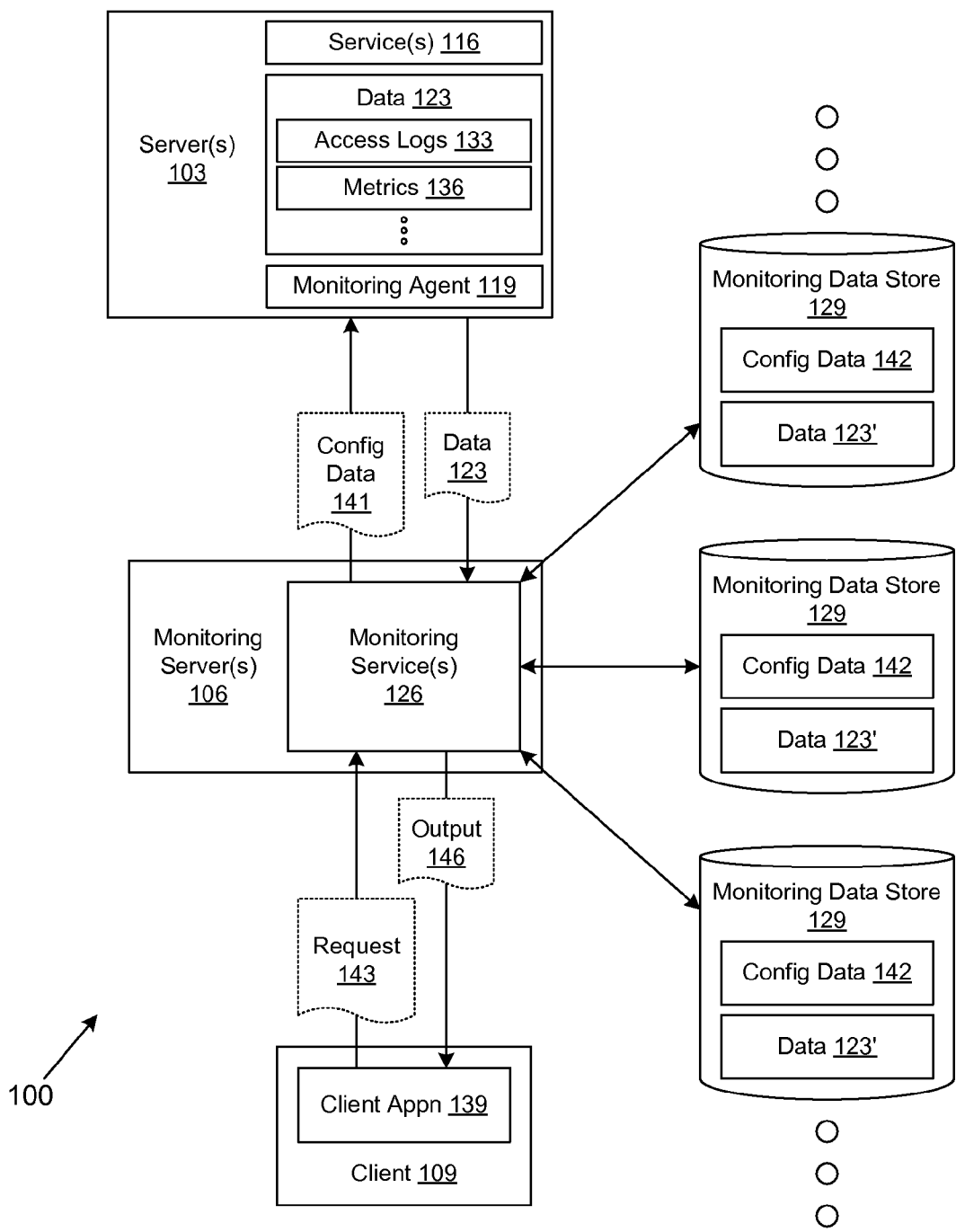
FIG. 2 is a drawing of that illustrates the operation of various components of the monitoring network of FIG. 1 according to various embodiments of the present disclosure.

Referring next to FIG. 2, shown is a portion of the monitoring network 100 that illustrates the operation of the monitoring network 100 according to various embodiments of the present disclosure. As shown, the services 116 and the servers 103 generate the data 123 as described above. In this respect, the data 123 may comprise, for example, access logs 133, metrics 136, or any other type of data associated with the operation of the services 116 and the servers 103 that comprises information by which one may assess the operating condition of the services 116 as executed on the servers 103.

The monitoring agent 119 is configured to transmit the data 123 to the monitoring service(s) 126 of the monitoring servers 106. One of the applications implemented by the monitoring service(s) 126 processes the data 123 into data 123' that is stored in a respective one of the monitoring data stores 129. The processing performed on the data 123 is to condition and/or transform the data 123 so that it can be stored and accessed in an efficient manner. Some of the data 123' may actually be the same as the data 123 received from a server 103. The conditioning and/or transformation of the data 123 into the data 123' may involve, for example, the aggregation of data received from a plurality of hosts such as the servers 103. Also, logs included in the data 123 may be changed by attaching keys or other information thereto to aid in searching for and finding specific portions of the data 123' in the future.

The monitoring data stores 129 may be located in physical positions that are distant from each other. Also, the monitoring data stores 129 may be redundant with respect to each other, thereby providing a more reliable storage of the data 123. It may further be the case that monitoring data stores 129 are located in close physical proximity to the servers 103, where a given entity may operate the servers 103, the monitoring servers 106, and the monitoring data stores 129.

The client 109 may include a client application 139 that facilitates interaction with the monitoring service(s) 126. In one embodiment, the client application 139 is executed to obtain an assessment of the operating condition of the services 116 and the servers 103 as well as to obtain other information inherent in the data 123. Alternatively, the client application 139 may be an automated system that performs various automated functions based upon the information inherent in the data 123/123'.

In order to provide for proper operation, various components of the monitoring network 100 are configured for operation. In particular, a client 109 may be manipulated to interface with configuration components of the monitoring services 126 to configure various outputs of devices, etc. For instance, the monitoring agent 119 or the monitoring service(s) 126 may be configured so as to be able to detect an alarm condition. As such, these components may be configured with various alarm thresholds and the like to detect alarm conditions. The content and form of reports requested by specific clients 109 that are to be generated based upon the data 123' may be configured. Various data access configurations may be created that dictate what data is accessed in response to respective requests from specific clients 109.

For example, the monitoring service(s) 126 communicate configuration data 141 to the monitoring agent 119 that informs the operation of the monitoring agent 119. Such configuration data 141 may control how often the monitoring agent 119 transmits the data 123 to the monitoring services 126. The configuration data 141 may further provide thresholds that define when various alarms or events that may occur during the normal operation of the monitoring agent 119. In addition, the configuration data 141 may be employed for other purposes.

In addition, the monitoring service(s) 126 interact with a client 109 in order to configure thresholds or conditions for alarms and the like, and the action to be taken when the thresholds or conditions are reached. The monitoring service(s) 126 may interact with clients 109 to configure reports that are generated based upon the data 123' that are sent to users either automatically or upon request. Based on the interaction between a given client 109 and the monitoring service(s) 126, the monitoring service(s) 126 generate configuration data 142 that is stored in the monitoring data store 129 for future reference in responding to various requests from respective clients 109.

The client application 139 is executed to interact with the monitoring service(s) 126. In one embodiment, the client application 139 may comprise, for example, a browser or other application where the client application 139 may include a web server or similar application. An individual may manipulate the client application 139 in order to send a request 143 to the monitoring service(s) 126 for a desired output generated from at least a portion of the data 123'. In response to the request, the monitoring service(s) 126 may generate an output 146 that is generated based upon the relevant data identified in the request 143.

In order to determine how to generate the output 146, the monitoring service(s) 126 consult the respective configuration data 142 that applies to the request. For example, the configuration data 142 may relate to a specific username and password used to log in with the client 109. The output 146 is generated based upon the respective configuration data 142.

The output 146 may comprise data in various forms including log data, metrics, charts, graphs, alarms, or other data from which an assessment of the operating condition of the services 116 and the servers 103 can be discerned. For example, the output 146 may comprise a graph that shows internal state services, service response latency, service response availability over time, a measure of service reliability, server memory usage, or other data. Also, the output 146 may comprise messages warning of alarm conditions or events. Further, the output 146 may be configured to set forth data 123' in a predefined form that is recognizable to an automated function implemented on a client 109 or other device.

Where the client application 139 comprises a browser or like system, then the client application 139 may be employed to access data in the form of graphs or charts that are made for human consumption so that a user can ascertain the health of the respective services 116 and servers 103. Alternatively, the client application 139 may comprise an automated system that performs various automated functions. One such example may comprise the function of controlling whether servers 103 in a server bank were powered up or down, depending upon whether demand for the respective services 116 was high or low. The automated function may request data 123' expressed in a predefined format based on respective configuration data 142 through the monitoring service(s) 126 from which to determine exactly when to turn servers on and off.

In addition, various monitoring service(s) 126 may repeatedly process data 123' to detect predefined conditions and generate alarms when such conditions are detected. Further, the monitoring service(s) 126 facilitate the setting of alarm thresholds and conditions that are used to identify alarm conditions. The alarms may be expressed in the form of a message or other output to which appropriate personnel may react.

Figure 3:
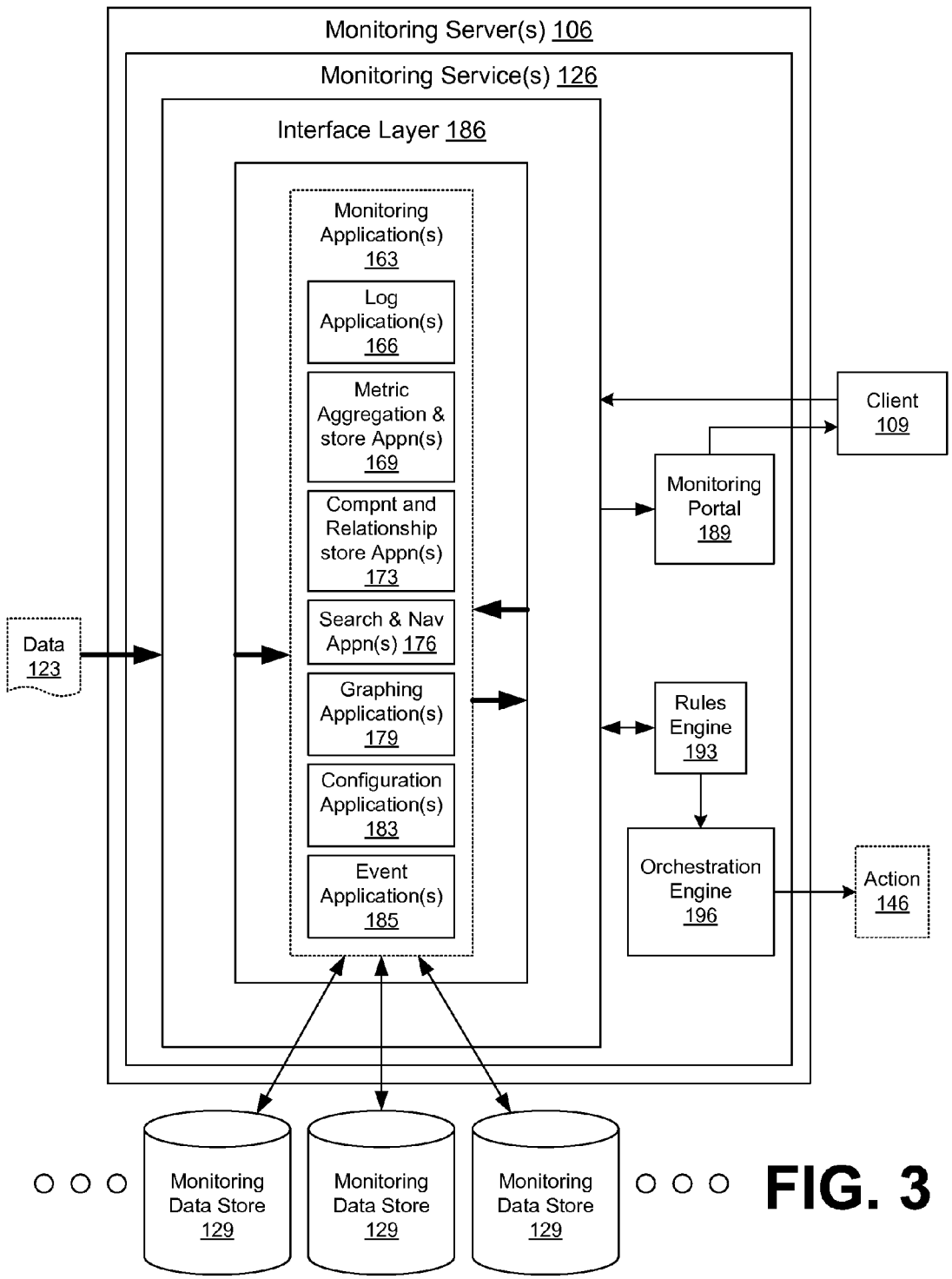
FIG. 3 is a block diagram of a monitoring server employed in the monitoring network of FIG. 1 according to various embodiments of the present disclosure.

Turning then to FIG. 3, shown is a block diagram that provides one example illustration of the monitoring service(s) 126 as they are implemented on the one or more monitoring servers 106 according to various embodiments.

As shown, the monitoring services 126 include various monitoring applications 163. The monitoring applications 163 comprise a log application 166, a metric aggregation & store application 169, a component and relationship store application 173, a search and navigation application 176, graphing applications 179, configuration applications 183, and event applications 185. It is understood that the monitoring applications 163 described herein are examples and are not an all inclusive list, where other applications may be employed in addition to those described herein. Each of the monitoring applications 163 is configured to perform various monitoring functions with respect to the data 123 stored in the monitoring data stores 129 to facilitate an assessment of an operating condition of the services 116 (FIG. 1) as they are executed on the servers 103 (FIG. 1), and the operating condition of the servers 103 themselves.

The monitoring applications 163 are "surrounded" by an interface layer 186 that may comprise, for example, an application programming interface or other appropriate interface mechanism. The interface layer 186 defines a messaging format that is used by devices that are external to the interface layer 186 and the monitoring applications 163 to interact with the monitoring applications 163 to obtain access to the data 123. Also, the messaging format defined by the interface layer 186 provides for forwarding data 123 to the monitoring applications 163 for future storage in the monitoring data store(s). Access to the data 123 stored is provided to facilitate an assessment of the operating condition of the services 116 and the servers 103.

The interface layer 186 "surrounds" the monitoring applications in that all communication by devices external to the interface layer 186 to and from the monitoring applications 163 flows through the interface layer 186. Given that the interface layer 186 defines a messaging format that is to be used by external devices to interact with the monitoring applications 163, and, given that all communication to and from the monitoring applications 163 flows through the interface layer 186, the interface layer 186 advantageously hides any complexity of the monitoring applications 163 as seen by applications external to the interface layer 186. The messaging formats defined by the interface layer 186 may be specified, for example, using an Extensible Markup Language (XML) schema or other appropriate mechanism.

The various monitoring applications 163 provide various functions relative to the data 123 so as to facilitate the assessment of the operating condition of the services 116 or the servers 103 as mentioned above. While a detailed discussion of the various monitoring applications 163 is omitted herein, the following provides a brief description of the basic functions of the monitoring applications 163.

The log applications 166 are implemented to effect the archiving of unstructured data 123 such as access logs and the like. Such logs may comprise, for example, human readable data that is generated by the services 116 or the servers 103 to describe various events or circumstances that may have occurred with respect to the operation of the services 116 or the servers 103. In addition, the log applications 166 facilitate access to data 123 that is stored in the monitoring data stores 129. The log applications 166 also facilitate access to the data 123 stored on the monitoring data stores 129 based upon a query submitted by a client 109. In this respect, the log applications 166 allow a user to narrow the scope of the query along various parameters such as the time that the data 123 was generated, the host that generated the data 123, or based upon the text contained within respective logs. In this respect, where vast amounts of log data is stored in the monitoring data stores 129, a user can narrow down a given query to a specific window of such data that is small enough so as to enable the display of the actual log data generated. This may be done, for example, to troubleshoot specific problems that may have been experienced by the services 116 or the servers 103.

The metric aggregation and store applications 169 are employed to process raw data such as unstructured data to obtain useful information such as metrics therefrom. The metric aggregation and store applications 169 may perform mining operations to mine logs and other portions of the data 123 for desired information that bears on the availability, latency, or reliability of the operation of respective services 116 on servers 103. For example, the metric aggregation and store applications 169 may be executed to determine how many access logs exist over a given period of time for a given service 116 to identify the usage of the service by third parties. Alternatively, the access logs may be examined to determine how many failures occurred in serving up content to clients 109 over a given period of time, thereby relating to the availability of the service 116. Once the metrics are identified and stored, such information may then be presented to a user using appropriate graphs, as will be described.

The component and relationship store applications 173 facilitate the dynamic discovery of services 116 and relationships between them. In this respect, the locations at which services 116 are executed on respective servers 103 may be tracked. The relationships discovered may comprise, for example, interprocess relationships involving service-to-service or business-to-business communications, dependencies between services 116, physical relationships, and other types relationships. For example, a relationship may exist between a service and a database that holds information needed by the service to operate. In addition, other functions may be performed.

The search and navigation applications 176 are executed to find various objects and associations between data/objects stored as part of the data 123. The search and navigation application 176 may thus find service names, host classes, host names, and other information needed for the general monitoring functions. The objects and associations discovered are exposed for use by other monitoring applications 163.

The graphing applications 179 are executed to create graphs based upon metrics that may be obtained from the metric aggregation and store application 169 or other source. The graphs that are generated may depict various metrics as they occur over time as will be described. These graphs may be used by a monitoring portal 189 in order to construct a monitoring dashboard that is sent to and displayed by a client 109 so that an individual can access the health of the services 116 and servers 103. Alternatively, the graphing applications 179 may generate graphs and the like that are distributed to multiple recipients, where the recipients are noted in the configuration data 142.

The configuration applications 183 allow for users to specify various information that is to be collected and presented in the form of graphs or some other format on a given client 109. In this respect, the configuration applications 183 allow users to specify reports that they wish to be generated that reflect the availability, latency, reliability, and other characteristics of their services 116 as executed on respective servers 103. After desired reports are configured by virtue of interaction with the configuration applications 183, users can periodically receive the configured reports to get updates as to the health of their services 116 and servers 103. Also, the configuration applications 183 provide for the configuration of outputs 146 (FIG. 2) that are generated in response to requests 143 from automated applications.

In addition, the configuration applications 183 allow users to define anomalies, error conditions, alarm thresholds, and other conditions by which the respective monitoring applications 163 such as the event applications 185 to be discussed can react and generate appropriate outputs. For example, various error conditions may be defined by which appropriate alarms are generated and sent to respective users. Also, users may define the precise actions to be taken in view of an occurrence of various conditions. For example, one action may be to send an e-mail that indicates the anomaly that has occurred or some other action may be specified. The configuration applications 183 generate configuration data 141/142 that is provided to the monitoring agent(s) 119 and is stored in the monitoring data stores 129 as described above.

The event applications 185 are configured to detect or react to various events that may exist by virtue of the data 123 that is received and stored in the monitoring data store 129 and to trigger various outputs in response to such events. Also, the event applications 185 may respond to alarms that may be received as a portion of the data 123 and generate appropriate outputs. In response to various predefined events, the event applications 185 may be configured to create tracking tickets, reboot a server, implement the physical allocation of hardware, specify user action to be taken, or other actions.

While the above discussion sets forth an overview of the operational aspects of the various monitoring applications 163, it is understood that such discussion is not comprehensive and that the respective monitoring applications 163 may include further functionality beyond that described. In addition, other monitoring applications 163 may be included that are not specifically described herein.

In addition, the monitoring services 126 include the monitoring portal 189, a rules engine 193, and an orchestration engine 196. The rules engine 193 is configured to receive information from the various monitoring applications 163 through the interface layer 186 and determines whether various actions are to be taken based on the state of the data 123 obtained. Such data may include, for example, access logs, metrics, events, components, or relationships that are obtained from the data 123 stored in the monitoring data store 129.

The rules engine 193 determines whether various actions are to be taken such as generating alarms, rebooting servers, or other actions, depending upon the configuration specified by a user as provided, for example, by the configuration application 183. Once the rules engine 193 determines that actions are to be taken, the rules engine 193 communicates with the orchestration engine 196 that is configured to orchestrate the execution of such action as is necessary, thereby generating output 146. In this respect, the output 146 may be a tracking ticket, an e-mail, or other message to a user that informs them of the respective condition that exists within the services 116 or servers 103. Also, other actions may involve rebooting servers 103, or other user actions as specified.

Monitoring portal 189 constructs various dashboards or other display outputs based upon the graphs generated by the graphing applications 179 or data displayed in some other form. According to one embodiment, the monitoring portal 189 may generate a display as an XML file that is transmitted to a client 109 and rendered by a client application 139 (FIG. 2), although other formats beyond XML and other applications in a client 109 beyond a client application 139 may be employed.

Figure 4:
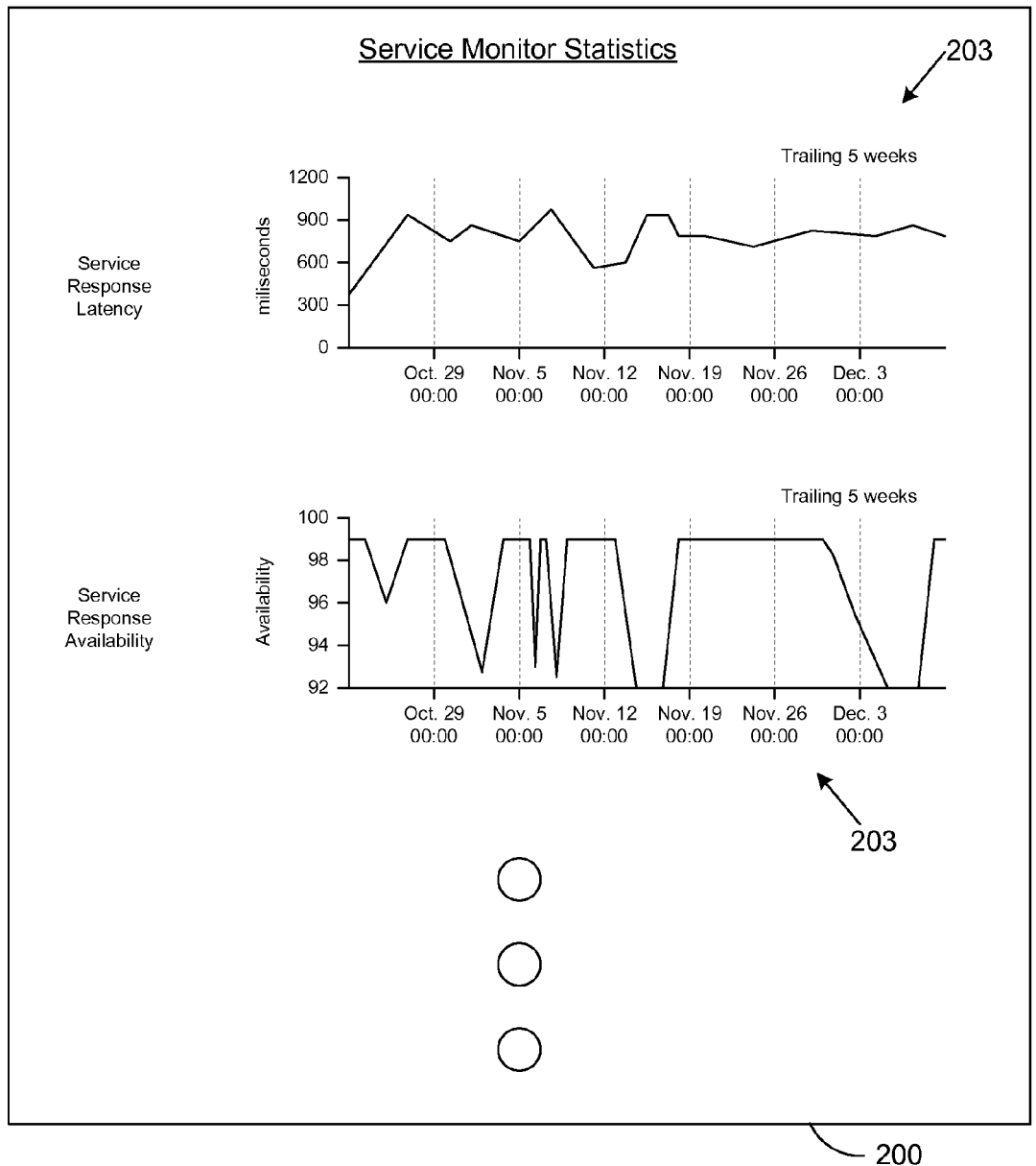
FIG. 4 is a drawing of a user interface generated by various subsystems in the monitoring server employed in the monitoring network of FIG. 1 according to various embodiments of the present disclosure.

Turning to FIG. 4, shown is one example of a user interface 200 that may be generated by the monitoring portal 189 using graphs generated by the graphing applications 179. The user interface 200 is served up to the client 109 to be rendered for a user as a display, printout, or other rendering.

As shown, the user interface 200 includes graphs 203 that depict various metrics obtained from the data 123 stored in the monitoring data stores 129. The data has comprises metrics associated with predefined timeframes by virtue of the operation of the various monitoring applications 163 as described above. The timeframe may be specified, for example, as a period of time relative to a predefined point in time. That is to say, that upon specifying a given point in time, the timeframe may be specified as a predefined period of time occurring before the point of time specified. For example, if a user identifies a point in time in a current day from which to view the operating condition of the services 116 on the servers 103, then it may be the case that a graph is automatically created based upon a specified configuration for a trailing window of time (i.e. 5 weeks) from the point of time specified.

The user interface 200 of the respective metrics may comprise several graphs 203 that depict several metrics. Alternatively, the user interface 200 may depict various logs, metrics, or other information in other formats.

Figure 5:
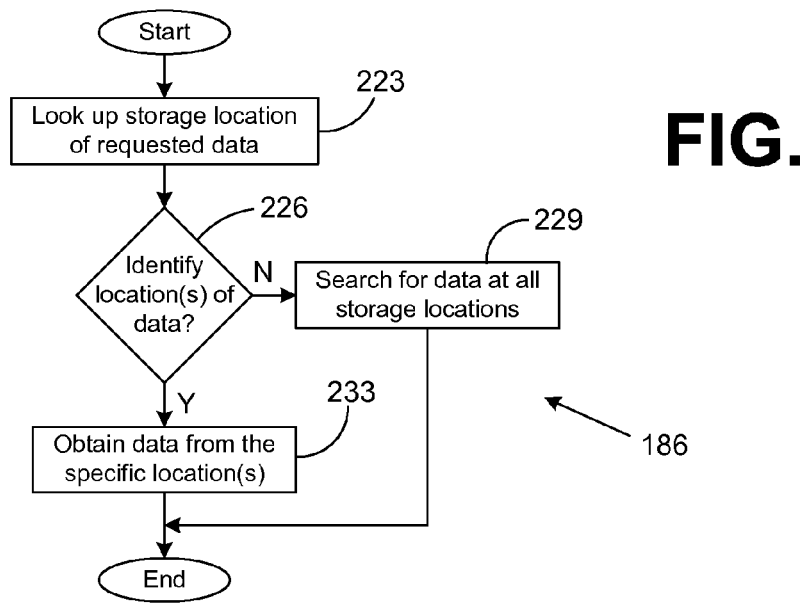
FIGS. 5 and 6 are flow charts that show examples of various operations performed by an interface layer employed in the monitoring server of FIG. 3 according to various embodiments of the present disclosure.

Referring next to FIG. 5, shown is a flow chart that provides one example of a function of the interface layer 186 according to various embodiments. Alternatively, the flow chart of FIG. 5 may be viewed as depicting steps of a method implemented in the monitoring server 106. The flowchart of FIG. 5 depicts a function implemented in the interface layer 186 in order to obtain data that is stored in multiple ones of the monitoring data stores 129. The data 123 obtained from monitoring data stores 129 that are stored in many geographically diverse locations. This reflects the fact that it may be the case that a request for data 123 by a client 109 requires access to data 123 that is stored in multiple ones of the monitoring data stores 129 that are located in geographically diverse locations with respect to each other. As a consequence, the interface layer 186 ensures that all of the data requested is accessed from wherever it is stored and presented to a requesting client 109 as if it originated at a single point.

Beginning with box 223, the interface layer 186 attempts to look up the storage location(s) of requested data 123. In box 226, if the interface layer 186 cannot identify all the locations of the requested data, then the interface layer 186 proceeds to box 229 in which it performs a search for data in all of the respective monitoring data stores 129 and accesses the desired data wherever it is found. It should be noted that the interface layer 186 may cause this function to occur by interfacing with an appropriate one of the monitoring applications 163 as described above. Thereafter, the portion of the interface layer 186 ends as shown.

If in box 226 the interface layer 186 is able to identify locations of the desired data 123, then the interface layer 186 proceeds to box 233 in which the desired data is obtained from the specific monitoring data stores 129 at the various locations. Thereafter, the interface layer 186 ends as shown.

Figure 6:
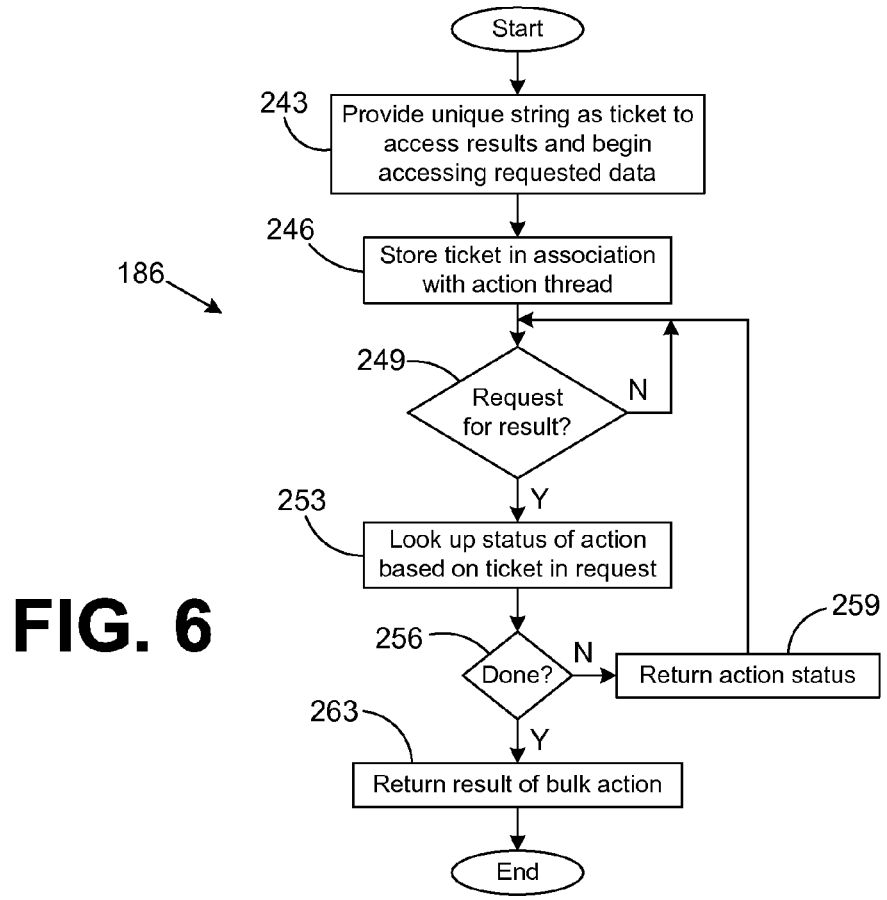

With reference next to FIG. 6, shown is flow chart that provides an example of another portion of the interface layer 186 that is executed in order to obtain asynchronous access to bulk or very large amounts of the data 123 stored in the respective monitoring data stores 129 (FIG. 3). Alternatively, the flow chart of FIG. 6 may be viewed as depicting steps of a method implemented in the monitoring server 106.

A bulk amount of data as contemplated herein is of such a size that such data cannot be accessed from the respective monitoring data stores 129 and returned to a client 109 within a response timeout limit imposed by a network protocol of a network through which a client 109 communicates with the interface layer 186 to request the bulk data.

In this respect, the interface layer 186 provides for a synchronous response capability that is configured to generate a response to a request or call from a client 109 that involves an action relating to a portion of the data 123 within the response limits imposed by a network protocol of a network over which the client 109 communicates with the interface layer 186. In this respect, the client 109 may request a report, for example, relating to the status of the operation of a service 116 that is generated in real time in the form of several graphs that are transmitted back to the client 109 within the response limits imposed by the network protocol.

Alternatively, the interface layer 186 also includes an asynchronous response capability that is configured to generate a deferred response to a request or call from a client 109 that involves a given action relating to a portion of the data 123. The asynchronous response capability is directed to those responses that take a longer time to generate than the response limits imposed by the network protocol will allow.

For example, in some cases a client 109 may request a bulk amount of data that will take the monitoring applications 163 significant time to access from the monitoring data stores 129 based upon the sheer amount of data that needs to be accessed and loaded into the monitoring server 106 from the respective monitoring data stores 129. The asynchronous response capability of the interface layer 186 allows clients 109 to communicate over various networks according to respective network protocols and still provide outputs that may take longer to generate than the response limits imposed by the respective network protocols.

The flow chart of FIG. 6 depicts one example of an operation of the interface layer 186 in providing an asynchronous response to a request or call involving an action relating to the data 123. In the example of FIG. 6, as requested by a client 109, the respective action to be taken is to obtain a bulk amount of data stored in the monitoring data stores 129.

Beginning with box 243, when the request from a client 109 is received, the interface layer 186 generates a unique string of characters that serves as a ticket that is sent to the client 109 to access the ultimate results of the request. At the same time, the interface layer 186 implements accessing the requested bulk data. Thereafter, in box 246, the ticket is associated with the action thread, for example, by storing the ticket value in a table in association with the request, where the action taken in response to the request involves accessing the bulk amount of data from the monitoring data stores 129.

Then, in box 249, the interface layer 186 determines whether a further request was received from the client 109 for the data that was to be accessed based on the original request. Such an additional request would include the ticket sent to the client in box 243 so that the interface layer 186 may look up the status of the bulk data access action. Assuming that a request was received in box 249, then in box 253, the interface layer 186 looks up the status of the bulk retrieval action based upon the ticket in the request. In box 253, the interface layer 186 determines whether the retrieval of the bulk amount of data has completed. If not, then the interface layer 186 proceeds to box 259 in which the status of the current bulk retrieval action is sent back to the client 109 in response to the request received as determined in box 249. Thereafter, the interface layer 186 reverts back to box 249 to await further requests from the client 109. On the other hand, if the action is complete in box 256, then in box 263, the result of the specific action requested is transmitted to the client 109. Thereafter, this portion of the interface layer 186 ends as shown.

As stated above, the interface layer 186 defines various actions that are processed by the interface layer 186 in order to simplify the interface with the respective monitoring applications 163 as perceived by the client 109. The messaging format defined by the interface layer 186 includes various actions as will be described in greater detail below. The clients 109 communicate with the interface layer 186 using the actions defined by the interface layer 186. This simplifies the interaction between the clients 109 and the monitoring applications 163 as the clients 109 are provided with a uniform set of actions that may be used rather than using static relationships between clients 109 and monitoring applications 163 that must be maintained and updated as needed. Also, the interface with the monitoring applications 163 presented by the interface layer 186 can be exposed to the public, thereby allowing the monitoring services to be made available to third parties. It should be noted that while various actions are described below, it is understood that additional actions may be employed beyond those specifically described herein.

Advantageously, the actions defined by the messaging format are programming language agnostic in that any programming language may be used by the client 109 to interact with the interface layer 186. That is to say, that the interface layer 186 removes the necessity of communicating with the respective monitoring applications 163 in their native language.

The messaging format defined by the interface layer 186 defines a "Get" action that is processed by the interface layer 186 to obtain a portion of the data 123 from the monitoring data stores 129. In this respect, various metrics, logs, components, relationships, events, graphs, and any other information included in the data 123 may be obtained using this action. When specifying this action, a given client 109 may also provide attributes that allow the interface layer 186 to communicate with the monitoring applications 163 so as to specifically identify and obtain the desired data. For example, time attributes may be employed with the Get action to obtain a portion of the data 123 that was generated within a predetermined timeframe by virtue of the operation of one or more of the services 116 as executed by one or more of the servers 103 (FIG. 1). In addition, other parameters may be used as attributes of the Get action as is appropriate.

The messaging format associated with the interface layer 186 further defines "Put" actions that may be employed by the monitoring agents 119 executed on the servers 103 to provide data to the interface layer 186 so that the interface layer 186 can direct respective ones of the monitoring applications 163 to store the data in respective monitoring data stores 129. The data 123 that is stored is that which is generated by the services 116, and the servers 103 upon which the services 116 are executed as described above.

One type of Get action defined by the messaging format is a "GetGraph" action that is processed by the interface layer 186 to cause the generation of a graphical depiction of one or more metrics as described above with respect to FIG. 4. For example, the GetGraph action may be employed to generate the graphical depiction of the portion of data 123 that is generated within a predefined timeframe by virtue of the operation of at least one of the services 116 in at least one of the servers 103. In this respect, the GetGraph action may be implemented to generate a graph from metrics obtained using the Get action described above. In one specific example, a graphic depiction of a metric associated with the data 123 may include a depiction of the metric occurring over a first time frame and a depiction of the same metric occurring over a second time frame based upon data obtained using the Get action. This would allow side-by-side comparison of the metric as it was generated over the first and second time frames.

In addition, the interface layer 186 is further configured to authenticate a request or call received from a client 109. In this respect, the interface layer 186 may employ typical authentication procedures such as requiring a username and password, or other information unique to a given user to effect authentication. To this end, authentication information such as usernames, passwords, and/or other information may be stored in association with the monitoring servers 106 to facilitate authentication.

The messaging format also includes a "ListMetrics" action that is processed by the interface layer 186 to implement a search for metrics using any combination of parameters that is supported by the interface layer 186. The combinations of parameters may be specified for the interface layer 186 using, for example, a metrics schema or other like device.

The messaging format further defines a "ListEvents" action that may be employed to search for various alarms, events, anomalies, or other information occurring in the data 123 based upon a number of parameters as specified as attributes to the action. Such parameters may be specified by an event schema or in some other manner.

The messaging format also specifies a "GetEventDetail" action that is processed by the interface layer 186 to obtain fine grained detail for any given event based upon that event's specific event identifier.

In addition, other actions provide for adding, editing, and searching for various configurations of outputs that clients wish to receive based on their requests. Also, various actions are provided that the interface layer 186 processes to provide components and relationships between various services 116, etc., to clients 109. Actions are further provided to add or delete components and relationships to or from various client configurations.

The interface layer 186 as described above provides various advantages in that several versions of the interface layer 186 may be maintained concurrently allowing the easy introduction of updated interfaces, while keeping older interfaces operational. Also, the interface layer 186 hides the complexity of the various monitoring applications 163 from the client 109, thus simplifying the task of the client 109 in obtaining data and providing data to the various monitoring applications 163. Further, the interface layer 186 provides for authentication and both synchronous and asynchronous responses to clients 109 where network parameters might independently dictate response times.

In addition, the interface layer 186 is dynamically scalable relative to variation in the load of processing requests received from external devices such as, for example, the servers 103, services 116, and clients 109. To do this, the number of hosts employed to implement the interface layer 186 and the monitoring applications 163 may vary dynamically based upon the variation in the load of processing requests. Thus, the interface layer 186 is horizontally scalable to the size of the load of processing requests without substantive change. The hosts may be added or taken away depending upon the size of the load at any given time. As a consequence, the monitoring functionality of the monitoring applications 163 is available to clients 109 and other devices without disruption or delay due to variation in the load of processing requests.

In addition, the interface layer 186 allows monitoring services to be provided to third parties who do not wish to perform such monitoring services on their own. Thus, the interface layer 186 allows third parties to interface with the monitoring applications 163 without divulging specific information as to the operation of the monitoring applications 163.

Figure 7:
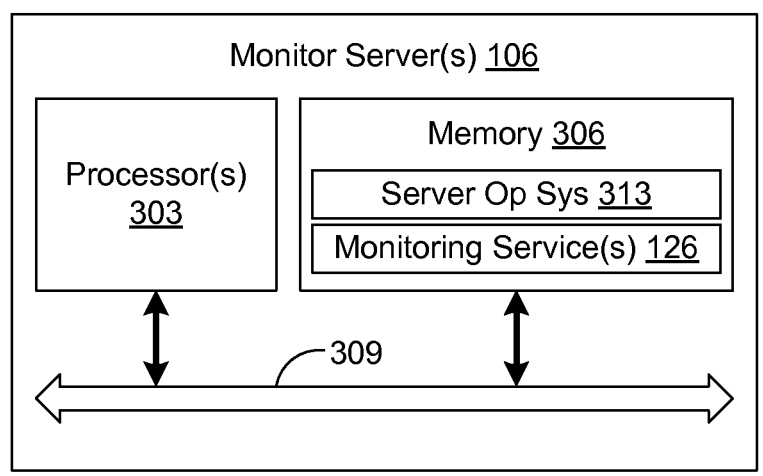
FIG. 7 is a block diagram of one embodiment of the monitoring server of FIG. 3 according to various embodiments of the present disclosure.

With reference to FIG. 7, shown is one example of a monitoring server 106 according to an embodiment of the present invention. The monitoring server 106 may include one or more processor circuits having a processor 303 and a memory 306, both of which are coupled to a local interface 309. In this respect, the local interface 309 may comprise, for example, a data bus with an accompanying control/address bus as can be appreciated. The monitoring server 106 is one example of a server computer that may be employed as can be appreciated.

Stored on the memory 306 and executable by the processor 303 are various components such as a server operating system 313 and the monitoring services 126. In addition, it is understood that many other components may be stored in the memory 306 and executable by the processor 303.

As set forth above, with reference to FIG. 7, a number of components are stored in the memory 306 are executable by the processor 303. In this respect, the term "executable" refers to a program file that is in a form that can ultimately be run by the processor 303. Examples of executable programs may be, for example, a compiled program that can be translated into machine code in a format that can be loaded into a random access portion of the memory 306 and run by the processor 303. Executable programs may also be source code that may be expressed in proper format such as object code that is capable of being loaded into a random access portion of the memory 306 and executed by the processor 303. An executable program may be stored in any portion or component of the memory 306 including, for example, random access memory, read-only memory, a hard drive, compact disk (CD), floppy disk, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors and the memory 306 may represent multiple memories that operate in parallel processing circuits, respectively. In such a case, the local interface 309 may be an appropriate network that facilitates communication between any two of the multiple processors, between any processor and any of the memories, or between any two of the memories, etc. The processor 303 may be of electrical or optical construction, or of some other construction as can be appreciated by those with ordinary skill in the art.

The operating system 313 is executed to control the allocation and usage of hardware resources such as the memory, processing time and peripheral devices in the monitor server 106. In this manner, the operating system 313 serves as the foundation on which applications depend as is generally known by those with ordinary skill in the art.

Although the functionality of the monitoring service(s) 126 is/are described as being embodied in software or code executed by general purpose hardware as discussed above, as an alternative the same may also be embodied in dedicated hardware or a combination of software/general purpose hardware and dedicated hardware. If embodied in dedicated hardware, the functionality of the monitoring service(s) 126 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, user interfaces, and/or the flow charts of FIGS. 1-7 show the architecture, functionality, and operation of an implementation of the monitoring service(s) 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the monitoring service(s) 126 is/are expressed in the form of software or code, it/they can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the monitoring service(s) 126 for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the disclosure. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. A system, comprising:
    an amount of data stored in a plurality of data storage devices, the data being generated by a plurality of services executed on a plurality of servers, and by the plurality of servers upon which the plurality of services are executed;
    a plurality of monitoring applications executed in a monitoring server, the plurality of monitoring applications being configured to perform a plurality of monitoring functions with respect to at least a portion of the data to facilitate an assessment of an operating condition of the plurality of services and the plurality of servers;
    an interface layer surrounding the plurality of monitoring applications in the monitoring server, the interface layer defining a messaging format that is used by at least one device external to the interface layer to interact with the plurality of monitoring applications to access the data to facilitate the assessment of the operating condition of the plurality of services and the plurality of servers, wherein interaction with the plurality of monitoring applications by the at least one device external to the interface layer to access the data is channeled through the interface layer; and
    wherein the messaging format further defines a plurality of actions, individual ones of the plurality of actions being programming language agnostic, wherein the plurality of actions comprise at least one of:
        a first get action that is processed by the interface layer to obtain a portion of the data from the plurality of data storage devices;
        a second get action that is processed by the interface layer to obtain a portion of the data generated within a predefined time frame by virtue of an operation of at least one of the plurality of services and at least one of the plurality of servers;
        a put action by which the data is received and stored by the interface layer, the data being received from the plurality of services and the plurality of servers upon which the plurality of services are executed; or
        an action that is processed by the interface layer to generate a graphical depiction of a metric associated with at least a portion of the data generated within at least one predefined time frame by virtue of the operation of at least one of the plurality of services and at least one of the plurality of servers.

2. The system of claim 1, wherein the predefined time frame is specified as a period of time relative to a predefined point in time.

3. The system of claim 1, wherein the graphical depiction of the metric associated with at least the portion of the data further comprises a graphical depiction of a metric occurring in a first time frame and in a second time frame, thereby allowing comparison of the metric occurring over the first and second time frames.

4. The system of claim 1, wherein the interface layer further comprises:
    a synchronous response capability that is configured to generate a response to a first call involving a first action relating to at least a portion of the data within a response limit imposed by a network protocol; and
    an asynchronous response capability that is configured to generate a deferred response to a second call involving a second action relating to at least a portion of the data outside the response limit imposed by the network protocol.

5. The system of claim 1, wherein the interface layer is dynamically scalable relative to a variation in a load of processing requests from the at least one device external to the interface layer.

6. The system of claim 5, wherein a number of hosts employed to implement the interface layer and the plurality of monitoring applications may vary dynamically based at least in part upon the variation in the load of processing requests.

7. The system of claim 1, wherein the data is generated by both the plurality of services and the plurality of servers.

8. The system of claim 7, wherein the data comprises log data.

9. The system of claim 7, wherein the data comprises a plurality of metrics.

10. The system of claim 1, wherein the data undergoes a transformation after the data is received and before the data is stored by the interface layer.

11. The system of claim 1, wherein the graphical depiction of the metric associated with at least the portion of the data further comprises a graphical depiction of a plurality of metrics.

12. The system of claim 1, wherein the interface layer further comprises a synchronous response capability that is configured to generate a response to a first call involving a first action relating to at least a portion of the data within response limits imposed by a network protocol.

13. The system of claim 1, wherein the interface layer further comprises an asynchronous response capability that is configured to generate a deferred response to a second call involving a second action relating to at least a portion of the data outside a response limit imposed by a network protocol.

14. The system of claim 13, wherein the second action involves retrieving a bulk amount of data, where a time it takes to retrieve the bulk amount of data is greater than the response limit imposed by the network protocol.

15. The system of claim 13, wherein the interface layer is configured to issue a ticket that is employed by a client to request a status of a retrieval of a bulk amount of data until the retrieval of the bulk amount of data is complete.

16. The system of claim 1, wherein the interface layer is configured to authenticate a call received from a client.

17. A method, comprising:
  surrounding a plurality of monitoring applications with an interface layer, the interface layer defining a messaging format that is used by at least one device external to the interface layer to interact with the plurality of monitoring applications, the plurality of monitoring applications being executed in a monitoring server;
  receiving, in the interface layer, data from a plurality of services executed on a plurality of servers, and from the plurality of servers upon which the plurality of services are executed, the data being received at the interface layer through a network;
  storing the data in a plurality of data storage sites;
  channeling access to the data by the at least one device external to the interface layer through the interface layer; and
  performing at least one monitoring function with respect to the data stored in the at least one data storage site using the plurality of monitoring applications, the at least one monitoring function facilitating an assessment of an operating condition of the plurality of services executed on the plurality of servers, and of the plurality of servers upon which the plurality of services are executed; and
  wherein the messaging format further defines a plurality of actions, individual ones of the plurality of actions being programming language agnostic, wherein the plurality of actions comprise at least one of:
    a first get action that is processed by the interface layer to obtain a portion of the data from the plurality of data storage sites;
    a second get action that is processed by the interface layer to obtain a portion of the data generated within a predefined time frame by virtue of an operation of at least one of the plurality of services and at least one of the plurality of servers;
    a put action by which the data is received and stored by the interface layer, the data being received from the plurality of services and the plurality of servers upon which the plurality of services are executed; or
    an action that is processed by the interface layer to generate a graphical depiction of a metric associated with at least a portion of the data generated within at least one predefined time frame by virtue of the operation of at least one of the plurality of services and at least one of the plurality of servers.

18. The method of claim 17, further comprising dynamically scaling an operation of the interface layer relative to a variation in a load of processing requests from the at least one device external to the interface layer.

19. The method of claim 18, wherein dynamically scaling the operation of the interface layer further comprises dynamically varying a number of hosts employed to implement the interface layer and the plurality of monitoring applications based at least in part upon the variation in the load of processing requests.

20. The method of claim 17, wherein performing at least one monitoring function further comprises:
  identifying a portion of the data generated by virtue of the operation of at least one of the plurality of services and at least one of the plurality of servers; and
  generating a graphical depiction of a metric associated with the portion of the data.

21. The method of claim 17, wherein performing at least one monitoring function further comprises:
  identifying plurality of logs included in the data that were generated within a predefined time frame by virtue of the operation of at least one of the plurality of services and at least one of the plurality of servers; and
  generating an output of the plurality of logs for display on a client.

22. The method of claim 20, wherein generating the graphical depiction of the metric associated with the portion of the data further comprises generating the graphical depiction of the metric occurring in a first time frame and in a second time frame, thereby allowing comparison of the metric occurring over the first and second time frames.

23. The method of claim 17, wherein performing at least one monitoring function further comprises:
  detecting a predefined condition existing in the data; and
  generating an alarm output in response to the detection of the predefined condition existing in the data; and
  transmitting the alarm output through the interface layer to an external device.

24. The method of claim 17, wherein the data received from the plurality of services executed on the plurality of servers, and from the plurality of servers upon which the plurality of services are executed data comprises log data.

25. The method of claim 17, wherein the data received from the plurality of services executed on the plurality of servers, and from the plurality of servers upon which the plurality of services are executed data comprises a plurality of metrics.

26. The method of claim 17, further comprising applying a transformation to the data after the data is received and before the data is stored by the interface layer.

27. The method of claim 17, further comprising generating a synchronous response in the interface layer to a first call involving a first action relating to at least a portion of the data within response limits imposed by a network protocol.

28. The method of claim 17, further comprising generating a deferred response in the interface layer to a second call involving a second action relating to at least a portion of the data outside a response limit imposed by a network protocol.

29. The method of claim 28, wherein the generation of the deferred response in the interface layer involves retrieving a bulk amount of data, where a time it takes to retrieve the bulk amount of data is greater than the response limit imposed by the network protocol.

30. The method of claim 17, wherein the predefined time frame is specified as a period of time relative to a predefined point in time.

31. The method of claim 17, wherein the data is generated by both the plurality of services and the plurality of servers.

32. A non-transitory computer-readable medium embodying a program executable on a processor circuit, comprising:
a plurality of monitoring applications configured for execution in a monitoring server, the monitoring applications being configured to perform a plurality of monitoring functions with respect to data stored in a plurality of data storage devices, the data being generated by a plurality of services executed on a plurality of servers, and by the plurality of servers upon which the plurality of services are executed, the plurality of monitoring functions facilitating an assessment of an operating condition of the plurality of services and the plurality of servers based at least in part upon the data;
an interface layer surrounding the monitoring applications, the interface layer defining a messaging format that is used by at least one device external to the interface layer to interact with the monitoring applications to access the data to facilitate the assessment of the operating condition of the plurality of services and the plurality of servers, wherein access to the data by the at least one device external to the interface layer is channeled through the interface layer; and
wherein the messaging format further defines a plurality of actions, individual ones of the plurality of actions being programming language agnostic, wherein the plurality of actions comprise at least one of:
a first get action that is processed by the interface layer to obtain a portion of the data from the plurality of data storage devices;
a second get action that is processed by the interface layer to obtain a portion of the data generated within a predefined time frame by virtue of an operation of at least one of the plurality of services and at least one of the plurality of servers;
a put action by which the data is received and stored by the interface layer, the data being received from the plurality of services and the plurality of servers upon which the plurality of services are executed; or
an action that is processed by the interface layer to generate a graphical depiction of a metric associated with at least a portion of the data generated within at least one predefined time frame by virtue of the operation of at least one of the plurality of services and at least one of the plurality of servers.

33. The non-transitory computer-readable medium of claim 32, wherein the predefined time frame is specified as a period of time relative to a predefined point in time.

34. The non-transitory computer-readable medium of claim 32, wherein the graphical depiction of the metric associated with at least the portion of the data further comprises a graphical depiction of a metric occurring in a first time frame and in a second time frame, thereby allowing comparison of the metric occurring over the first and second time frames.

35. The non-transitory computer-readable medium of claim 32, wherein the interface layer further comprises:
a synchronous response capability that is configured to generate a response to a first call involving a first action relating to at least a portion of the data within a response limit imposed by a network protocol; and
an asynchronous response capability that is configured to generate a deferred response to a second call involving a second action relating to at least a portion of the data outside the response limit imposed by the network protocol.

36. The non-transitory computer-readable medium of claim 32, wherein the interface layer is dynamically scalable relative to a variation in a load of processing requests from the at least one device external to the interface layer.

37. The non-transitory computer-readable medium of claim 36, wherein a number of hosts employed to implement the interface layer and the plurality of monitoring applications may vary dynamically based at least in part upon the variation in the load of processing requests.

38. The non-transitory computer-readable medium of claim 32, wherein the data is generated by both the plurality of services and the plurality of servers.

39. The non-transitory computer-readable medium of claim 38, wherein the data comprises log data.

40. The non-transitory computer-readable medium of claim 38, wherein the data comprises a plurality of metrics.

41. The non-transitory computer-readable medium of claim 32, wherein the data undergoes a transformation after the data is received and before the data is stored by the interface layer.

42. The non-transitory computer-readable medium of claim 32, wherein the interface layer is further configured to generate a deferred response to a second call involving a second action relating to at least a portion of the data outside a response limit imposed by a network protocol.

43. The non-transitory computer-readable medium of claim 42, wherein generation of the deferred response in the interface layer involves retrieving a bulk amount of data, where a time it takes to retrieve the bulk amount of data is greater than the response limit imposed by the network protocol.

44. A system, comprising:
first means for performing a plurality of monitoring functions with respect to data stored in a plurality of data storage devices, the data being generated by a plurality of services executed on a plurality of servers, and by the plurality of servers upon which the plurality of services are executed, the plurality of monitoring functions facilitating an assessment of an operating condition of the plurality of services and the plurality of servers based at least in part upon the data;
second means, surrounding the first means, for defining a messaging format that is used by at least one device external to the second means to interact with the first means to access the data to facilitate the assessment of the operating condition of the plurality of services and the plurality of servers, wherein access to the data by the at least one device external to the second means is channeled through the second means; and wherein the messaging format further defines a plurality of actions, individual ones of the plurality of actions being programming language agnostic, wherein the plurality of actions comprise at least one of:
- a first get action that is processed by the second means to obtain a portion of the data from the plurality of data storage devices;
- a second get action that is processed by the second means to obtain a portion of the data generated within a predefined time frame by virtue of an operation of at least one of the plurality of services and at least one of the plurality of servers;
- a put action by which the data is received and stored by the second means, the data being received from the plurality of services and the plurality of servers upon which the plurality of services are executed; or
- an action that is processed by the second means to generate a graphical depiction of a metric associated with at least a portion of the data generated within at least one predefined time frame by virtue of the operation of at least one of the plurality of services and at least one of the plurality of servers.

45. The system of claim 44, wherein the predefined time frame is specified as a period of time relative to a predefined point in time.

46. The system of claim 44, wherein the graphical depiction of the metric associated with at least the portion of the data further comprises a graphical depiction of a metric occurring in a first time frame and in a second time frame, thereby allowing comparison of the metric occurring over the first and second time frames.

47. The system of claim 44, wherein the second means further comprises:
- a synchronous response capability that is configured to generate a response to a first call involving a first action relating to at least a portion of the data within a response limit imposed by a network protocol; and
- an asynchronous response capability that is configured to generate a deferred response to a second call involving a second action relating to at least a portion of the data outside the response limit imposed by the network protocol.

48. The system of claim 44, wherein the second means is dynamically scalable relative to a variation in a load of processing requests from the at least one device external to the second means.

49. The system of claim 48, wherein a number of hosts employed to implement the second means and the first means may vary dynamically based at least in part upon the variation in the load of processing requests.

50. The system of claim 44, wherein the data is generated by both the plurality of services and the plurality of servers.

51. The system of claim 50, wherein the data comprises log data.

52. The system of claim 50, wherein the data comprises a plurality of metrics.

53. The system of claim 44, wherein the data undergoes a transformation after the data is received by the first means and before the data is stored by the second means.

54. The system of claim 44, wherein the second means is further configured to generate a deferred response to a second call involving a second action relating to at least a portion of the data outside a response limit imposed by a network protocol.

55. The system of claim 54, wherein generation of the deferred response in the second means involves retrieving a bulk amount of data, where a time it takes to retrieve the bulk amount of data is greater than the response limit imposed by the network protocol.

* * * * *